(12) United States Patent
Kubota et al.

(10) Patent No.: US 9,328,781 B2
(45) Date of Patent: May 3, 2016

(54) EXTERNAL-CONTROL TYPE FAN CLUTCH DEVICE

(71) Applicant: USUI KOKUSAI SANGYO KAISHA LTD., Shimizu-cho, Sunto-gun, Shizuoka (JP)

(72) Inventors: Satoshi Kubota, Shimizu-cho (JP); Hiroki Sugawara, Shimizu-cho (JP)

(73) Assignee: USUI KOKUSAI SANGYO KAISHA LTD. (JP)

( * ) Notice: Subject to any disclaimer, the term of this patent is extended or adjusted under 35 U.S.C. 154(b) by 0 days.

(21) Appl. No.: 14/601,575

(22) Filed: Jan. 21, 2015

(65) Prior Publication Data

US 2015/0219168 A1 Aug. 6, 2015

(30) Foreign Application Priority Data

Jan. 31, 2014 (JP) ................................ 2014-017033

(51) Int. Cl.
| | |
|---|---|
| *F16D 31/00* | (2006.01) |
| *F16D 35/02* | (2006.01) |
| *F01P 7/04* | (2006.01) |
| *F16D 48/06* | (2006.01) |

(52) U.S. Cl.
CPC ............... *F16D 35/024* (2013.01); *F01P 7/042* (2013.01); *F16D 48/064* (2013.01)

(58) Field of Classification Search
CPC ....... F16D 35/024; F16D 48/064; F01P 7/042
See application file for complete search history.

(56) References Cited

U.S. PATENT DOCUMENTS

| | | | | | |
|---|---|---|---|---|---|
| 5,722,523 | A | * | 3/1998 | Martin | F16D 35/024 192/58.5 |
| 5,992,594 | A | * | 11/1999 | Herrle | F16D 35/024 192/58.61 |
| 7,191,883 | B2 | * | 3/2007 | Angermaier | F16D 35/024 192/58.61 |
| 7,854,307 | B2 | * | 12/2010 | Hennessy | F16D 35/024 192/58.61 |
| 7,886,886 | B2 | | 2/2011 | Schultheiss et al. | |
| 2004/0223851 | A1 | * | 11/2004 | Shiozaki | F01P 7/042 417/15 |
| 2006/0096830 | A1 | * | 5/2006 | Shiozaki | F16D 35/024 192/58.61 |
| 2006/0272918 | A1 | * | 12/2006 | Shiozaki | F16D 35/024 192/58.61 |
| 2007/0068762 | A1 | * | 3/2007 | Bhat | F16D 35/024 192/58.61 |
| 2007/0095627 | A1 | * | 5/2007 | Hagiwara | F16D 35/024 192/58.61 |
| 2013/0037371 | A1 | * | 2/2013 | Yamada | F16D 35/024 192/58.5 |
| 2014/0360834 | A1 | * | 12/2014 | Kubota | F01P 5/04 192/84.1 |

* cited by examiner

*Primary Examiner* — David J Hlavka
(74) *Attorney, Agent, or Firm* — Gerald E. Hespos; Michael J. Porco; Matthew T. Hespos

(57) ABSTRACT

Provided is an external-control type fan clutch device that can suppress unnecessary rotation of a cooling fan at the time of activating a rotary shaft effectively regardless of stop positions of an oil supply port and an oil recover port at a stop time of the fan. The fan clutch device includes a valve member for opening/closing an oil circulating flow passage hole provided on a side wall face of the annular oil reserving chamber, wherein opening/closing of the oil circulating flow passage hole is controlled by the valve member, wherein an oil supply chamber, that is formed of a partition wall composed of an arc-like wall and a plate-like partition wall for shielding one end of the arc-like partition wall, is provided in the annular oil reserving chamber, and the oil circulating flow passage hole and an oil recovery port are arranged in the oil supply chamber.

1 Claim, 4 Drawing Sheets

EXTERNAL-CONTROL TYPE FAN CLUTCH DEVICE

BACKGROUND

1. Field of the Invention

The present invention generally relates to an external-control type fan clutch device that controls fan rotation for cooling engine in an automobile or the like according to a change in ambient temperature or a rotation change of an engine, and in particular, relates to an external-control type fan clutch device that can suppress unnecessary rotation of a cooling fan occurring when the cooling fan transitions from a stop state to a rotating state.

2. Description of the Related Art

Conventionally, as a fan clutch device of such a type, there has been known a viscous friction clutch for driving a cooling fan in a motor vehicle (see U.S. Pat. No. 7,886,886). The viscous friction clutch comprises a driving disk and a housing, an annular supply chamber and a working chamber, a supply device for supplying shear fluid (oil) from the supply chamber into the working chamber and a return device for returning the shear fluid from the working chamber to the supply chamber wherein part of the supply chamber includes a storage chamber for the shear fluid, the storage chamber being separated from the working chamber by a remainder of the supply chamber, and the viscous friction clutch has such a feature as the supply chamber being arranged in the driving disk; the storage chamber comprising an annular segment; the annular segment of the storage chamber being formed as a supplementary receptacle; or the supply chamber including at least one supply port and at least one return port (recovery port); the ports respectively forming part of the supply device and return device. An external-control type fan clutch device having such a configuration adopts such a system that an oil storage chamber is provided in an oil supply chamber, and unnecessary rotation of a cooling fan occurring when the cooling fan transitions from a stop state to a rotating state is suppressed by reducing an amount of oil leaking from an oil storage chamber side to a working chamber side through an oil supply port and an oil recovery port at the stop time of the cooling fan.

However, in the case of the above-described conventional external-control type fan clutch device, since oil can be stored in the oil storage chamber at the stop time of the cooling fan, a leaking amount of oil to the working chamber can be reduced, but an amount of oil which cannot be stored in the oil storage chamber at the stop time leaks from the oil recovery port and the oil supply port due to stopping positions of the oil supply port and the oil recovery port at the stop time of the cooling fan and thereby there has been such a drawback that a suppressing effect of the unnecessary rotation of the fan at a starting time of the engine cannot be obtained sufficiently.

SUMMARY OF THE INVENTION

The present invention has been made in order to solve the drawback of the conventional external-control type fan clutch device, and an object of the invention is to provide an external-control type fan clutch device that can suppress unnecessary rotation of a cooling fan at the time of activating a drive shaft more effectively, regardless of stop positions of an oil supply port and an oil recovery port at a stop time of the cooling fan.

An external-control type fan clutch device according to the present invention is configured to incorporate, between an electromagnet and a rotary shaft, a ring-like magnetic body to efficiently transmit a magnetic flux of the electromagnet to an armature of a valve member. The gist of the invention lies in that an external-control type fan clutch device including: a torque transmission chamber incorporating a drive disk therein and provided within a sealed housing, the sealed housing being composed of a non-magnetic case and a cover mounted on the case and being supported via bearings on a rotary shaft fixed with the drive disc; at least one oil circulating flow passage hole communicating with a torque transmission gap and provided on a side wall face of an annular oil reserving chamber by making inside of the drive disc hollow; a magnetic valve member for opening and closing the oil circulating flow passage hole, the valve member having an armature attached to a leaf spring mounted on the drive disk; an electromagnet supported on the rotary shaft via a bearing; and a ring-like magnetic member arranged on an outer periphery of the rotary shaft via a ring-like non-magnetic member, wherein opening and closing of the oil circulating flow passage hole are controlled by the valve member actuated by the electromagnet, and a rotation torque transmission from a driving side to a driven side is controlled by increasing and decreasing an effective contact area of oil in the torque transmission gap formed between the driving side and the driven side, wherein an oil supply chamber is provided in the annular oil reserving chamber (oil storage chamber), the oil supply chamber being formed of a partition wall composed of an arc-like wall concentric to the annular oil reserving chamber and a plate-like partition wall for shielding one end of the arc-like partition wall, and the oil circulating flow passage hole (oil supply port) and an oil recovery port are arranged in the oil supply chamber.

The external-control type fan clutch device according to the present invention not only can decrease oil leakage from the oil circulating flow passage hole (oil supply port) and the oil recovery port on the side of the oil reserving chamber to the side of the working chamber (torque transmission chamber) at a stop time of the cooling fan, but also can reduce an amount of leaking oil to the working chamber or can reduce the same to zero substantially regardless of stopped positions of the oil supply port and the oil recovery port by providing the oil supply chamber formed of the arc-like partition wall and the plate-like partition wall in the annular oil reserving chamber (oil storage chamber) and arranging the oil circulating flow passage hole (oil supply port) and the oil recovery port in the oil supply chamber, so that such an effect can be obtained that an unnecessary rotation of the cooling fan at the time when a drive shaft activates can be suppressed more effectively.

BRIEF DESCRIPTION OF THE DRAWINGS

FIG. 5A corresponding to a case where the oil supply port and the oil recovery port are positioned just below; FIG. 5B corresponding to a case where the oil supply port and the oil recovery port are positioned just above; FIG. 5C corresponding to a case where the oil recovery port the oil recovery port are positioned just beside (on a left side); and FIG. 5D corresponding to a case where the oil recovery port the oil recovery port are positioned just beside (on a right side).

DETAILED DESCRIPTION

Figure 1:
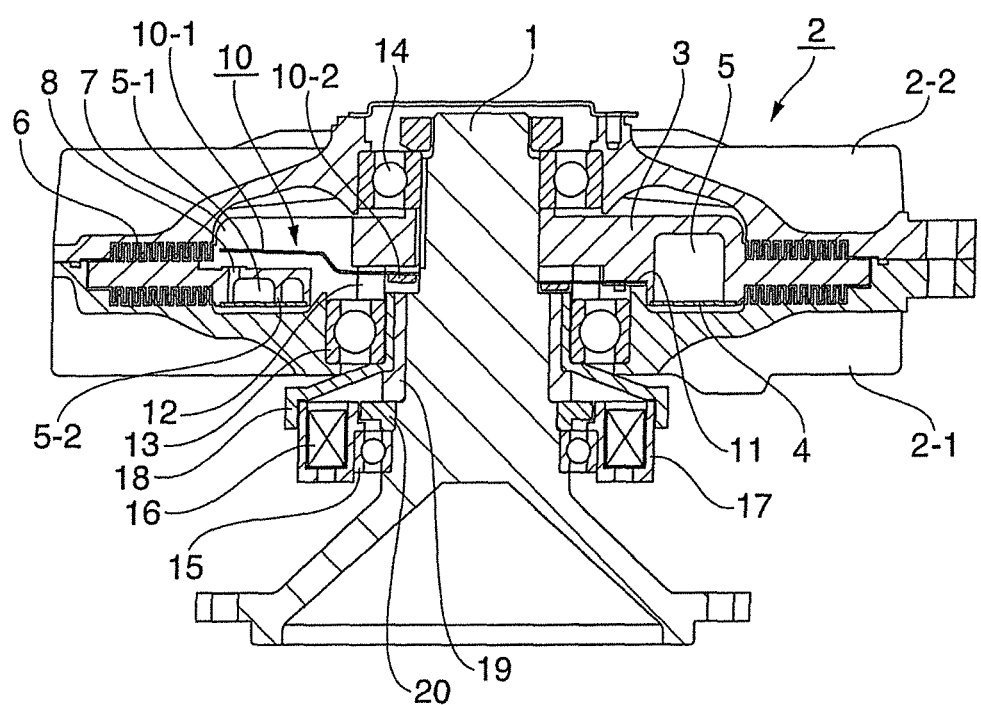
FIG. 1 is a longitudinal sectional view showing an embodiment of an external-control type fan clutch device according to the present invention.
Figure 2:
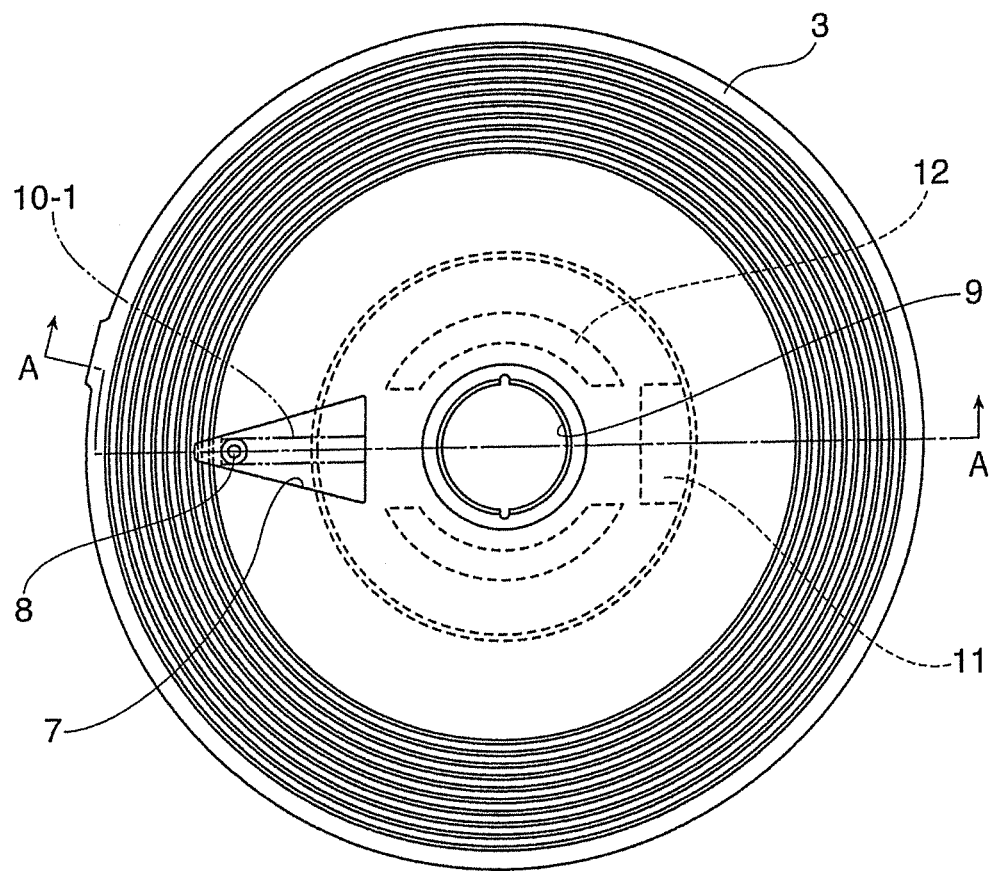
FIG. 2 is a plan view showing a drive disk of the external-control type fan clutch device according to the present invention.
Figure 3:
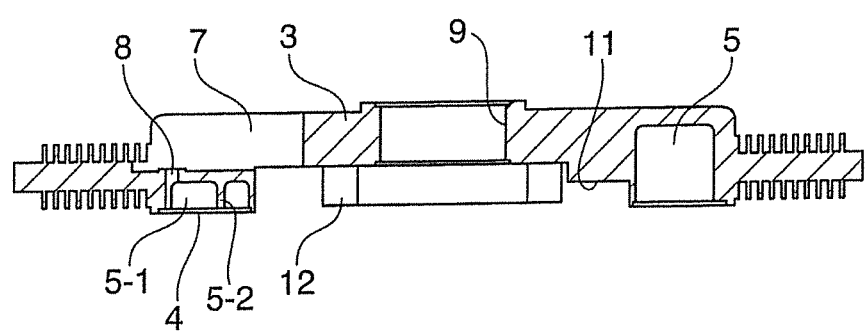
FIG. 3 is a longitudinal sectional view taken along line A-A in FIG. 2.
Figure 4:
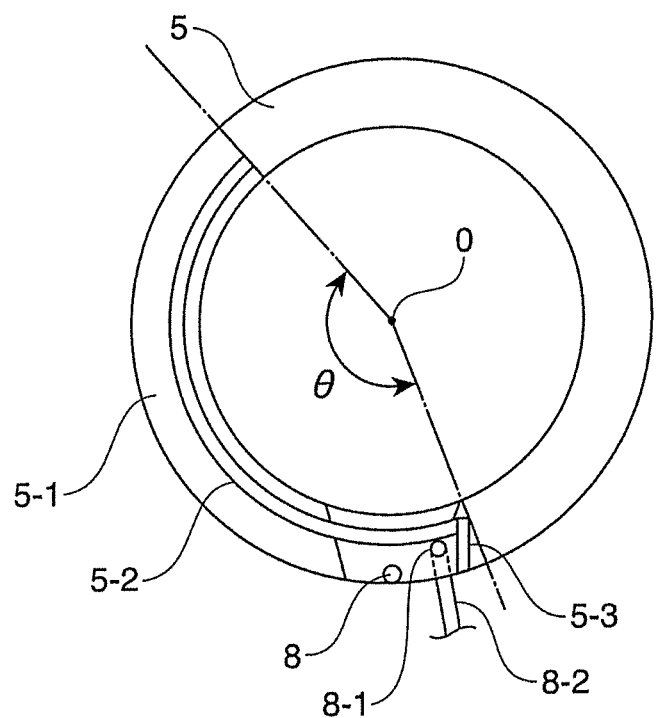
FIG. 4 is a schematic view showing an annular oil reserving chamber (oil storage chamber) provided in the drive disk of the external-control type fan clutch device according to the present invention.

In an external-control type fan clutch device shown in FIG. 1 to FIG. 4, a sealing housing 2 composed of a case 2-1 and a cover 2-2 is supported via bearings 13 and 14 on a rotary shaft (drive shaft) 1 rotated according to driving of a drive unit (engine), and a drive disk 3 fixed to the rotary shaft 1 is incorporated in a torque transmission chamber 6 within the sealed housing 2. As shown in FIG. 2 to FIG. 4, the drive disk 3 is configured such that an substantially triangular window hole 7 communicating with the torque transmission chamber 6 is provided at one end of an annular oil reserving chamber (oil storage chamber) 5 provided by making inside of the drive disk 3 hollow, and in addition, a mounting portion 11 for a valve member 10 described later is provided on the reverse side of the disk on the opposite side to the approximately triangular window hole 7, and arc-like disk supporting legs 12 are provided in a projecting fashion at positions opposed to each other outside of a shaft hole 9 of a disk center concentrically with the shaft hole 9, and the drive disk 3 is fixed to a section of the rotary shaft 1 positioned between the bearings 13 and 14 that support the sealed housing 2. Further, the drive disk 3 includes an oil supply chamber 5-1 formed of a partition wall 5-2 and a plate-like partition wall 5-3 in the annular oil reserving chamber 5, the partition wall 5-2 being composed of an arc-like partition wall concentric to the oil reserving chamber 5, the plate-like partition wall 5-3 serving to shield one end of the arc-like wall 5-2, and at least one oil circulating flow passage hole (oil supply port) 8 and an oil recovery port 8-1 communicating with a torque transmission gap are provided on a side wall face on an end side of the window hole 7 in the oil supply chamber. When a circumferential region of the oil supply chamber 5-1 provided in the annular oil reserving chamber 5 is represented by an angle θ (FIG. 4) formed by lines connecting a center point O of the drive disk 3 to both end portions of the partition wall 5-2 composed of the arc-like wall, though the angle is not limited particularly, the angle preferably falls into a range from 150° to 200°. The reason is that in the case of an angle of less than 150°, when the oil circulating flow passage hole (oil supply port) 8 and the oil recovery port 8-1 are positioned just below, a leaking amount of oil which cannot be stored in the oil reserving chamber into the torque transmission chamber cannot be reduced effectively, while in the case of an angle of more than 200°, when the oil supply port 8 and the oil recovery port 8-1 are positioned just below, even if a leaking amount of oil which cannot be stored in the oil reserving chamber into the torque transmission chamber can be reduced depending to an angle regarding the leaking amount of oil from the oil reserving chamber into the torque transmission chamber side, a problem that flow of oil deteriorates and oil does not enter the oil supply port smoothly occurs when the angle become excessively large. Further, when the oil supply chamber 5-1 is defined by a volume, the volume of the oil supply chamber 5-1 occupying the oil reserving chamber 5 preferably falls into a range from 30 to 40% of the oil reserving chamber 5. The reason is that in the case of a volume of less than 30%, when the oil supply port 8 and the oil recovery port 8-1 are positioned just below, a leaking amount of oil which cannot be stored in the oil reserving chamber into the torque transmission chamber cannot be reduced effectively, while in the case of a volume of more than 40%, a problem that flow of oil deteriorates and oil does not enter the oil supply port smoothly occurs, like the case where the oil reserving chamber 5-1 is defined by the angle. In the figures, reference numeral 4 denotes a separate plate and 8-2 denotes an oil recovery path.

The valve member 10 for feeding oil, which opens or closes the oil circulating flow passage hole 8 provided in the drive disk 3, is composed of a leaf spring 10-1 and an armature 10-2, and a proximal end of the leaf spring 10-1 is fixed, by a screw or the like, to the mounting portion 11 provided on the reverse side of the disk such that the armature 10-2 of the valve member is positioned in the vicinity of the rotary shaft 1. It goes without saying that a portion of the leaf spring 10-1 of the valve member 10 opposite to the proximal end is exposed from the approximately triangular window hole 7 provided in the drive disk to the side of the cover 2-2 so that a distal end portion thereof is positioned to face the oil circulating flow passage hole 8.

On the drive unit side of the sealed housing 2, a ring-like electromagnet 16 is supported on a ring-like electromagnet support 17 supported via a bearing 15 on the rotary shaft 1, a first magnetic ring 18 is arranged on an outer periphery of a cylindrical non-magnetic ring 19 fixed on an outer periphery of the rotary shaft 1 between the electromagnet 16 and the valve member 10, and a second magnetic ring 20 is further fitted on and fixed to the rotary shaft 1 between the electromagnet support 17 of the electromagnet 16 and the rotary shaft 1 so as to substantially come in contact with the electromagnet support 17. The second magnetic ring 20 is provided for transmitting magnetic flux of the electromagnet 16 to the armature 10-2 of the valve member efficiently.

In the fan clutch device having the above-described configuration, when the electromagnet 16 is in OFF (non-excited) state, the armature 10-2 is spaced from the oil circulating flow passage hole 8 of the drive disk 3 according to the function of the leaf spring 10-1 so that the oil circulating flow passage hole provided in the oil supply chamber 5-1 is opened, the oil reserving chamber 5 and the torque transmission chamber 6 communicate with each other, oil in the oil reserving chamber 5 is supplied from the oil supply chamber 5-1 provided in the oil reserving chamber 5 to the torque transmission chamber 6, which results in suppression of unnecessary rotation of the cooling fan (not shown) occurring when the cooling fan transitions from the stop state to the rotating state. On the other hand, when the electromagnet 16 is in ON (excited) state, the armature 10-2 is attracted against the leaf spring 10-1, so that the lead spring 10-1 is brought in pressure contact with the drive disk 3 and the oil circulating flow passage hole 8 is closed, which results in blocking supplying oil within the oil reserving chamber 5 to the torque transmission chamber 6.

Here, the reason why the unnecessary rotation of the cooling fan at the time of activating the rotary shaft can be prevented regardless of positions of the oil circulating flow passage hole (oil supply port) 8 and the oil recovery pot 8-1 by arranging the oil circulating flow passage hole 8 and the oil recovery port 8-1 in the oil supply chamber 5-1 provided in the annular oil reserving chamber 5 will be described with reference to FIGS. 5A to 5D. It should be noted that a hatched portion shows an oil storage amount at a stop time of the cooling fan in FIGS. 5A to 5D.

Figure 5A:
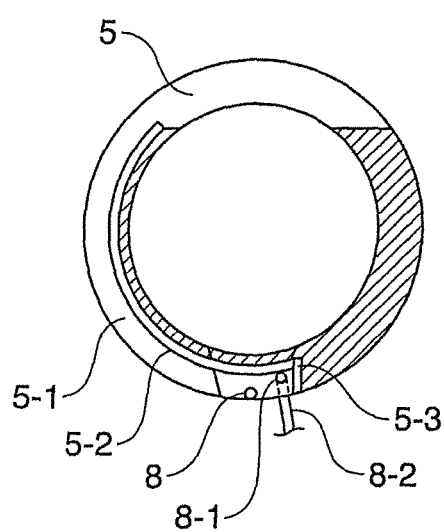
FIGS. 5A to 5D are schematic views showing oil reserving states depending on stopped positions of an oil supply port and an oil recovery port of an annular oil reserving chamber provided in a drive disk of the external-control type fan clutch device, respectively.
Figure 5B:
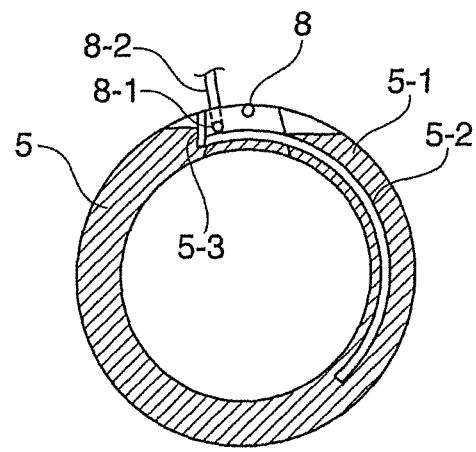
Figure 5C:
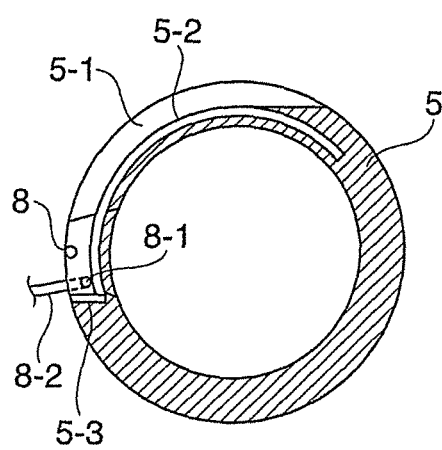
Figure 5D:
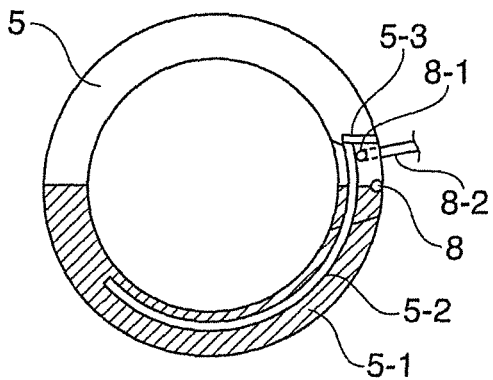

FIG. 5A shows a case where the oil circulating flow passage hole (oil supply port) 8 and the oil recovery port 8-1 are positioned just below, where since oil does not accumulate in the oil supply chamber 5-1, a leaking oil amount of oil which cannot be stored in the annular oil reserving chamber 5 into the torque transmission chamber 6 can be reduced at a stop time of the cooling fan. FIG. 5B shows a case where the oil circulating flow passage hole (oil supply port) 8 and the oil recovery port 8-1 are positioned just above, where a leaking oil amount of oil which cannot be stored in the annular oil reserving chamber 5 into the torque transmission chamber 6 can also be reduced at a stop time of the cooling fan, like the case shown in FIG. 5A. FIG. 5C shows a case where the oil circulating flow passage hole (oil supply port) 8 and the oil recovery port 8-1 are positioned just beside (on a left side), where a leaking oil amount of oil which cannot be stored in the annular oil reserving chamber 5 to the torque transmission chamber 6 can also be reduced at a stop time of the cooling fan, like the cases shown in FIGS. 5A and 5B. Further, FIG. 5D shows a case where the oil circulating flow passage hole (oil supply port) 8 and the oil recovery port 8-1 are positioned just beside (on a right side), where a leaking oil amount of oil which cannot be stored in the annular oil reserving chamber 5 into the torque transmission chamber 6 can also be reduced at a stop time of the cooling fan, like the cases shown in FIGS. 5A, 5B and 5C.

In addition, when the electromagnet 16 is in ON (excited) state, a magnetic circuit is composed of the electromagnet 16, the first magnetic ring 18, the armature 10-2, the rotary shaft 1, and the second magnetic ring 20, and magnetic flux flows in the order of the electromagnet 16→ the first magnetic ring 18→ the armature 10-2→ the rotary shaft 1→ the second magnetic ring 20, so that magnetic flux of the electromagnet 16 is transmitted to the armature 10-2 of the valve member efficiently, which can result in reduction of power consumption.

REFERENCE SIGNS LIST

1 rotary shaft (drive shaft)
2 sealed housing
2-1 case
2-2 cover
3 drive disk
4 separate plate
5 oil reserving chamber
5-1 oil supply chamber
5-2 partition wall composed of an arc-like partition wall
5-3 plate-like partition wall
6 torque transmission chamber
7 window hole
8 oil circulating flow passage hole
8-1 oil recovery port
8-2 oil recovery path
9 shaft hole
10 valve member
10-1 leaf spring
10-2 armature
11 mounting portion for valve member
12 disk supporting leg
13 bearing
14 bearing
15 bearing
16 electromagnet
17 electromagnet support
18 first magnetic ring
19 non-magnetic ring
20 second magnetic ring
O center point of drive disk

What is claimed is:

1. An external-control type fan clutch device, comprising:
   sealed housing being composed of a non-magnetic case and a cover mounted on the case with a torque transmission chamber being defined in the sealed housing between the case and the cover, the sealed housing being supported via housing bearings on a rotary shaft;
   a drive disc fixed to the rotary shaft and disposed in the torque transmission chamber so that a torque transmission gap is defined between the drive disc and the sealed housing, an annular oil reserving chamber being provided inside the drive disk and substantially concentrically around the rotary shaft, at least one oil circulating flow passage hole provided in the drive disc and communicating between the torque transmission gap and the oil reserving chamber;
   a magnetic valve member for opening and closing the oil circulating flow passage hole, the valve member having an armature attached to a leaf spring mounted on the drive disk;
   an electromagnet supported on the rotary shaft via a bearing;
   a ring-like non-magnetic member arranged on an outer periphery of the rotary shaft; and
   a ring-like magnetic member disposed on an outer periphery of the ring-like non-magnetic member,
   wherein opening and closing of the oil circulating flow passage hole are controlled by the valve member actuated by the electromagnet, and a rotation torque transmission from a driving side to a driven side is controlled by increasing and decreasing an effective contact area of oil in the torque transmission gap formed between the driving side and the driven side, and
   wherein an arcuate partition wall is provided in the annular oil reserving chamber concentric to the rotary shaft and a plate-like partition wall extends out from one circumferential end of the arcuate partition wall, an oil supply chamber defined in the annular oil reserving chamber radially outward of the arcuate partition wall and circumferentially adjacent the plate-like partition wall, and the oil circulating flow passage hole and an oil recovery port are arranged in the oil supply chamber.

* * * * *